United States Patent [19]

Lindner et al.

[11] Patent Number: 4,460,749

[45] Date of Patent: * Jul. 17, 1984

[54] RUBBER POWDERS

[75] Inventors: Christian Lindner, Cologne; Karl-Heinz Ott, Leverkusen, both of Fed. Rep. of Germany

[73] Assignee: Bayer Aktiengesellschaft, Leverkusen, Fed. Rep. of Germany

[*] Notice: The portion of the term of this patent subsequent to Jun. 26, 2001 has been disclaimed.

[21] Appl. No.: 336,915

[22] Filed: Jan. 4, 1982

[30] Foreign Application Priority Data

Jan. 13, 1981 [DE] Fed. Rep. of Germany ..... 31007538

[51] Int. Cl.$^3$ ............................................. C08F 279/02
[52] U.S. Cl. .................... 525/310; 524/458; 524/460; 525/309
[58] Field of Search ............... 523/201; 524/458, 460, 524/533, 534; 525/902, 309, 310

[56] References Cited

U.S. PATENT DOCUMENTS

| | | | |
|---|---|---|---|
| 3,787,522 | 1/1974 | Dickie | 525/902 |
| 3,833,682 | 9/1974 | Dickie | 525/309 |
| 3,959,408 | 5/1976 | Yusa | 525/902 |
| 3,985,703 | 10/1976 | Ferry | 523/201 |
| 4,141,932 | 2/1979 | Butler | 260/880 |
| 4,247,434 | 1/1981 | Lovelace | 523/201 |
| 4,264,678 | 4/1981 | Nelsen | 525/902 |
| 4,265,939 | 5/1981 | Tebbens | 525/902 |

FOREIGN PATENT DOCUMENTS

| | | |
|---|---|---|
| 2239503 | 2/1975 | France . |
| 2319655 | 2/1977 | France . |
| 2354352 | 1/1978 | France . |
| 1027724 | 4/1966 | United Kingdom . |
| 1469302 | 4/1977 | United Kingdom . |
| 1520338 | 8/1978 | United Kingdom . |

*Primary Examiner*—Paul R. Michl
*Attorney, Agent, or Firm*—Connolly and Hutz

[57] ABSTRACT

Free-flowing rubber powders containing particles of a diene, acrylate or EPDM rubber having an average diameter of from 0.01 to 10 mm which contain, polymerized thereon, a shell of the polymer or copolymer of one or more vinyl monomers in a quantity of from 2 to 20% by weight, based on the rubber, and a process for their production, wherein a latex of a diene, acrylate or an EPDM rubber having a glass transition temperature of below 0° C. is completely broken with the formation of an aqueous suspension of the rubber, from 2 to 20% by weight, based on the rubber, of one or more vinyl monomers which form polymers having glass transition temperatures of above 25° C. are then introduced into the suspension and the monomer(s) is/are polymerized, optionally after adding radical-forming catalysts.

3 Claims, No Drawings

RUBBER POWDERS

This invention relates to free-flowing rubber powders and to a process for the production thereof.

Rubber powders must be able to flow freely to ensure that the polymers may be easily incorporated, compounded, processed, stored and handled. For example synthetic rubbers which tend to stick together are powdered or coated with talcum, $TiO_2$ or $SiO_2$. However, such auxiliaries may have a detrimental effect of the properties of the polymers.

A process is described in German Offenlegungsschrift No. 2,801,817 to improve the handling properties of elastic graft rubbers by coagulating a vinyl polymer onto the surface of the rubber particles. The graft rubber particles are themselves also coagulated, but are not separated from the coagulant. This process requries a separate polymerisation stage for the vinyl polymer, and the ungrafted vinyl polymer changes the properties of the graft rubber.

A modified process is described in European Pat. No. 0,009,250; in this process, an organic solvent is used in addition to the vinyl polymer. This process has the same disadvantages and, moreover, the solvent has to be removed. If the known methods are applied to un-grafted rubbers, polymer mixtures having unfavourable properties are almost always produced.

It is also known from East German Pat. No. 86,500 to coagulate a rubber latex containing residual monomers and then to remove the remaining (and in this case undesired) residual monomers by polymerisation. Free-flowing rubber powders are not obtained in this manner, because the polymerised residual monomers produce a polymer which is identical to the rubber.

It is known from German Offenlegungsschrift No. 2,843,068 to polymerize additional quantities of the monomers which form the graft shell in the presence of a suspension of an ABS graft copolymer.

An object of the present invention is to provide a process for the production of free-flowing rubber powders containing particles having an average diameter of from 0.01 to 10 mm, wherein a latex of a diene rubber, acrylate rubber or EPDM rubber having glass transition temperatures of below 0° C. is completely broken with the formation of an aqueous suspension of the rubber, from 2 to 20%, by weight, based on the rubber, of one or more vinyl monomers which form polymers having glass transition temperatures above 25° C. are then introduced into the suspension and the monomer(s) is/are polymerised, optionally after adding a radical-forming catalyst.

Another object of the present invention is to provide free-flowing rubber powders containing particles of a diene, acrylate or EPDM rubber having an average diameter of from 0.01 to 10 mm, preferably from 0.05 to 8 mm, most preferably from 0.1 to 4 mm, which contain, polymerised thereon, a shell of the homo- or copolymer of one or more vinyl monomers in a quantity of from 2 to 20%, by weight, based on the rubber.

According to the present invention, it is possible to use all rubbers which are derived from dienes or acrylates and which are produced as aqueous emulsions. EPDM rubbers are also suitable, these are terpolymers of ethylene, propylene and a non-conjugated diene, provided they are in the form of an aqueous emulsion or have been converted into an aqueous emulsion.

All rubbers which are suitable for the purposes of the present invention may be present in un-cross-linked, partially cross-linked or highly cross-linked form.

The following are particularly preferred: butadiene-(co)polymers (with, for example, monomers, such as styrene, acrylonitrile, vinyl ethers, acrylates and methacrylates), and aliphatic acrylate-(co)polymers (acrylate rubbers).

Homo-polymers or copolymers of $C_1$-$C_{12}$ alkyl acrylates, in particular methyl, ethyl, propyl, n-butylhexyl-acrylate, and polymers which comprise at least 70%, by weight, of $C_1$-$C_{12}$ alkyl acrylate polymers are to be regarded as "acrylate rubbers" within the present context. The following, for example, may function as comonomers for the $C_1$-$C_{12}$ alkyl acrylates: styrene, acrylonitrile, alkyl methacrylates, butadiene, isoprene, vinyl esters, vinyl ethers, vinyl carboxylic acids, allyl alcohol, allyl esters and allyl ethers. The acrylate rubbers may be partially or completely cross-linked, for example, by polyfunctional vinyl or allyl monomers.

Preferred acrylate rubbers are emulsion polymers which have a gel content of >60%, by weight, and which have been cross-linked with polyfunctional and/or graft-cross-linking and/or graft-active monomers, for example, triallyl(iso)cyanurate, allyl(meth)acrylate and maleic acid allyl ester. Such acrylate rubbers are known (see German Offenlegungsschrift Nos. 2,256,301 and 2,558,476, German Auslegeschrift No. 2,624,656 and European Pat. No. 0,001,782).

The process according to the present invention may be carried out as follows:

Initially, a rubber latex is prepared. This emulsion is then completely broken, for example, by using electrolytes (such as acids and bases), mechanically or by heating. Coagulation with aqueous solutions of acids and/or salts at temperatures of from 30° to 100° C. is preferred. A heterogeneous suspension of discrete polymer particles varying in size and shape in water is obtained. The size and shape of the particles may be influenced by varying the precipitation conditions.

The vinyl monomer(s), such as styrene, acrylonitrile, allyl methacrylate, acrylic acid, methacrylic acid, vinyl acetate and optionally chain transfer agents, radical initiators, (in particular, water soluble persulphates) or antioxidants is/are then introduced into this vigorously stirred polymer suspension, preferably at temperatures of from 30° to 100° C. and the mixture is radically polymerised. The addition of suspending agents is unnecessary and should be avoided during this process.

The polymer according to the present invention is then isolated, for example, by filtration or centrifugation, and is then dried.

The process according to the present invention may be carried out in batches, semicontinuously or continuously.

The polymer powders according to the present invention are stable in storage, free-flowing and non-tacky. They may be processed into, for example, elastomers, vulcanized rubber and highly flexible plastics, in a particularly easy and economic manner, for example, by melt compounding.

EXAMPLES

1.

Preparation of acrylate rubber emulsions 1.1 The following mixture is introduced into a reactor with stirring at 63° C.:

| | |
|---|---|
| 5000 | parts, by weight of water, |
| 14 | parts, by weight of potassium persulphate, |
| 0.9124 | parts, by weight of triallylcyanurate, |
| 399.0876 | parts, by weight of n-butyl acrylate, and |
| 2 | parts, by weight of Na-sulphonate of $C_{14}$-$C_{18}$ hydrocarbons. |

The following mixtures were metered separately into the reactor over a period of 5 hours at 63° C.:

| | |
|---|---|
| Mixture 1: | 90 parts, by weight, of Na—sulphonate of $C_{14}$-$C_{18}$ hydrocarbons, and |
| | 11900 parts, by weight, of water. |

| | |
|---|---|
| Mixture 2: | 23.09 parts, by weight, of triallylcyanurate, and |
| | 10100.91 parts, by weight, of n-butyl acrylate. |

The mixture is then left for 2 hours at 65° C. to polymerise. The polymers which form contain from 85 to 95%, by weight, of gel.

1.2 The following mixture is introduced into a reactor with stirring at 63° C.:

| | |
|---|---|
| 5000 | parts, by weight, of water, |
| 5 | parts, by weight, of potassium persulphate, |
| 100 | parts, by weight, of methyl methacrylate, |
| 300 | parts, by weight, of ethyl hexyl acrylate, and |
| 2 | parts, by weight, of Na—sulphonate of $C_{14}$-$C_{18}$ hydrocarbons. |

The following mixtures were metered separately into the reactor over a period of 4 hours, at 63° C.:

| | |
|---|---|
| Mixture 1: | 90 parts, by weight, of Na—sulphonate of $C_{14}$-$C_{18}$ hydrocarbons, and |
| | 11900 parts, by weight, of water. |

| | |
|---|---|
| Mixture 2: | 400 parts, by weight, of methyl methacrylate, and |
| | 9724 parts, by weight, of ethyl hexyl acrylate. |

The mixture is then left for 3 hours at 65° C. to polymerise.

2.

Preparation of diene rubber emulsions 2.1 The following emulsion is polymerised in a reactor with stirring at 65° C. until essentially all the monomers are converted over a period of about 22 hours:

| | |
|---|---|
| 100 | parts, by weight, of butadiene, |
| 1.8 | parts, by weight, of Na—salt of disproportionated abietic acid, |
| 0.257 | parts, by weight, of sodium hydroxide, |
| 3 | parts, by weight, of n-dodecylmercaptan, |
| 1.029 | parts, by weight, of Na—ethylene diamine tetra-acetate, |
| 0.023 | parts, by weight, of potassium persulphate, |

-continued

| | |
|---|---|
| and | |
| 176 | parts, by weight, of water. |

A latex is obtained which contains polybutadiene particles in a concentration of from 35 to 36%, by weight.

2.2 A partially-cross-linked butadiene-acrylonitrile copolymer (for example, containing 29% of acrylonitrile) having a Mooney viscosity (Ml 4, 100° C., DIN 53 523:70-90) which is used, for example, as a polymer plasticiser and is known (for example, European Pat. No. 0,005,736) is prepared by aqueous emulsion polymerisation.

3.

Preparation of the rubber powders according to the present invention 3.1 The following are introduced into a reactor at 70° C.:

| | |
|---|---|
| 18800 | parts, by weight, of water, and |
| 245 | parts, by weight, of magnesium sulphate ($MgSO_4 \cdot xH_2O$) |

The following quantity of latex is then allowed to run into the reactor with stirring over a period of 2 hours:
11200 parts, by weight, of latex 1.1.

After the latex has been added, 3 parts, by weight, of potassium persulphate are introduced into the reactor and 460 parts, by weight, of methyl methacrylate are then uniformly introduced with stirring over a period of 1 hour. The suspension is then stirred for 3 hours at 80° C. The polymer may then be isolated.

3.2 Example 3.1 is repeated, but instead of methyl methacrylate, a mixture consisting of 130 parts, by weight, of acrylonitrile and 340 parts, by weight, of styrene are introduced into the rubber suspension.

3.3 Example 3.1 is repeated, but instead of potassium persulphate, 0.4 parts, by weight, of benzoyl peroxide, dissolved in methyl methacrylate is used.

3.4 Example 3.1 is repeated, but instead of methyl methacrylate, a mixture consisting of 360 parts, by weight, of methyl methacrylate, 100 parts, by weight, of styrene and 0.2 parts, by weight, of benzoyl peroxide is used.

3.5 Example 3.1 is repeated, but latex 1.2 is used instead of latex 1.1.

3.6 Example 3.1 is repeated, but latex 2.1 is used instead of latex 1.1.

3.7 The following are introduced into a reactor at 60° C.:

| | |
|---|---|
| 5000 | parts, by weight, of water, |
| 40 | parts, by weight, of $CaCl_2$ (calcium chloride), and |
| 30 | parts, by weight, of acetic acid. |

The following quantity of latex is then allowed to run into the reactor with stirring over a period of 2 hours:
4545 parts, by weight, of latex of the copolymer described under 2.2 (polymer solids: 22%, by weight).

After all the latex has been added to the electrolyte solution, 99 parts, by weight, of methyl methacrylate are metered into the polymer suspension at 70° C. with stirring over a period of 1 hour. 1.4 parts, by weight, of potassium persulphate are then added and the paste is then stirred for 3 hours at 90° C. The powder is isolated after stabilising with phenolic antioxidants.

4.

Comparative Examples 4.1 Preparation of an emulsion graft polymer consisting of about 90% of acrylate rubber and 10% of methyl methacrylate The following are introduced into a reactor:

3296 parts, by weight, of latex 1.1,
1.5 parts, by weight, of potassium persulphate, and
90 parts, by weight, of water.

The following solutions are introduced separately into the reactor at 65° C. over a period of 4 hours:

Solution A: 146 parts, by weight, of methyl methacrylate
Solution B: 150 parts, by weight, of water, and
3 parts, by weight, of Na—sulphonate of $C_{14}$-$C_{18}$ hydrocarbons.

The mixture is then allowed to polymerise for 4 hours at 65° C. This latex is stirred into a precipitation liquor of the following composition over a period of 2 hours at 70° C.:

7555 parts, by weight, of water, and
100 parts, by weight, of magnesium sulphate ($MgSO_4.xH_2O$)

After the latex has been added, the mixture is heated to 80° C. and is stirred for 1 hour at 80° C. The polymer is then isolated.

4.2 The following are introduced into a reactor at 60° C.:

5000 parts, by weight, of water,
40 parts, by weight, of calcium chloride, and
30 parts, by weight, of acetic acid.

The following quantity of latex is then allowed to run into the reactor with stirring over a period of 2 hours:
4545 parts, by weight, of the latex from Example 2.2.

After the latex has been added into the electrolyte solution, the paste is then stirred for 3 hours at 90° C. It is worked-up to a powder as in Example 3.7.

5.

Comparable powder and handling characterisation of products 3 and 4

The polymer suspensions are worked-up at room temperature using a laboratory centrifuge, the chamber of which has an internal diameter of 30 cm and operates at 1500 r.p.m.

The method is as follows:

The polymer suspension described in the above Examples are introduced into the centrifuge in such quantities that 1 kg of solids (based on dry weight) may be isolated per processing cycle. The material is then washed with water for 20 minutes while the centrifuge is operating, until the outflowing wash water is substantially free of electrolyte. It is then centrifuged dry for 5 minutes. The water content is then determined from this spin-dried material. The moist polymers are then dried for 24 hours at 70° C. on sheets in hot air dryers.

The resulting polymers are characterised with respect to pulverulence and tackiness.

| Polymer | Residual water content after centrifuging dry (%, by weight) | Characterisation of the dry polymers |
|---|---|---|
| 3.1 | 28 | Pourable powder which does not agglomerate during storage. |
| 3.2 | 27 | Pourable powder which does not agglomerate during storage. |
| 3.3 | 30 | Pourable powder which does not agglomerate during storage. |
| 3.4 | 27 | Pourable powder which does not agglomerate during storage. |
| 3.5 | 36 | Pourable powder which does not agglomerate during storage. (coarsely-divided) |
| 3.6 | 30 | Pourable powder which does not agglomerate during storage. |
| 3.7 | 38 | Pourable powder which does not agglomerate during storage. |
| 4.1 | 49 | lumpy, agglomerated rubber-like material |
| 4.2 | 47 | agglomerated material forming sheets. |

The Table shows that the polymers 3.1–3.7 according to the present invention are not only distinguished by advantageous low residual water contents compared to Example 4, but they are particularly distinguished by favourable powder characteristics which most advantageously influence the technological further usability of the materials.

The advantages of the process according to the present invention become particularly apparent when Example 4.1 is compared with Examples 3.1 and 3.3.

We claim:

1. A process for the production of a free-flowing rubber powder containing particles having an average diameter of from 0.01 to 10 mm, said process comprising completely breaking a latex of a diene, acrylate or an EPDM rubber having a glass transition temperature of below 0° C. so as to form an aqueous suspension of said rubber, then introducing into said aqueous suspension from 2 to 20% by weight, based on the rubber, of at least one vinyl monomer which forms a polymer having a glass transition temperature of above 25° C., and then polymerizing said vinyl monomer in the optional presence of a radical-forming catalyst but in the absence of a suspending agent.

2. The process of claim 1 wherein said rubber is a homo- or co-polymer of butadiene, isoprene or chloroprene, or a homo- or co-polymer of at least one alkyl acrylate having rubber properties or a terpolymer of ethylene, propylene and a non-conjugated diene.

3. The process of claim 1 wherein said vinyl monomer is selected from the group consisting of styrene, acrylonitrile, alkyl methacrylate and mixtures thereof.

* * * * *